United States Patent [19]

Kutaragi

[11] Patent Number: 4,630,144
[45] Date of Patent: Dec. 16, 1986

[54] TRACKING CONTROL APPARATUS

[75] Inventor: Ken Kutaragi, Kanagawa, Japan

[73] Assignee: Sony Corporation, Tokyo, Japan

[21] Appl. No.: 766,400

[22] Filed: Aug. 16, 1985

[30] Foreign Application Priority Data

Aug. 22, 1984 [JP] Japan .............................. 59-174362
Nov. 21, 1984 [JP] Japan .............................. 59-246550

[51] Int. Cl.$^4$ ..................... G11B 21/10; G11B 21/08
[52] U.S. Cl. ......................................... 360/77; 360/78
[58] Field of Search ............................ 360/77, 78, 18

[56] References Cited

U.S. PATENT DOCUMENTS 4,210,943 7/1980 Nakamura et al. .
4,224,643 9/1980 Nakano et al. .
4,562,562 12/1985 Moriya et al. ....................... 360/77

*Primary Examiner*—Vincent P. Canney
*Attorney, Agent, or Firm*—Lewis H. Eslinger; Alvin Sinderbrand

[57] ABSTRACT

Apparatus for recording or reproducing both digital and analog signals on or from respective substantially concentric recording tracks on a rotating magnetic disc with only digital or analog signals being recorded in any one of the tracks comprises a transducer mounted in substantially contacting relation to the magnetic disc for recording or reproducing the digital and analog signals on or from the tracks, a motor coupled to the transducer for moving the transducer radially with respect to the magnetic disc, a track status memory for storing track ID (identifying) information for each of the recording tracks and producing a track classifying signal corresponding thereto, and a level detecting circuit for detecting levels of signals reproduced from the tracks and producing a level indicating signal corresponding thereto. A control is jointly responsive to the track classifying signal and the level indicating signal for controlling the motor so that it positions the transducer in closed-loop servo tracking relation to a given track on the basis of the level indicating signal when the track classifying signal indicates that the given track or at least one track adjacent thereto contains an analog signal and otherwise effects open-loop positioning of the transducer regardless of the level indicating signal. This enables accurate reproduction of the analog signals coupled with rapid access to the digital signals.

7 Claims, 21 Drawing Figures

FIG. 9

TCT

| Track | b7 | b6 | b5 ······ b0 |
|---|---|---|---|
| 1 | 0 | 0 | ············ |
| 2 | 0 | 0 | ············ |
| 3 | 0 | 0 | |
| 4 | 0 | 1 | |
| 5 | 0 | 0 | |
| 6 | 1 | 0 | |
| 7 | 1 | 1 | |
| 8 | 1 | 1 | |
| 9 | 1 | 1 | |
| ⋮ | ⋮ | | |
| 50 | 0 | 0 | ············ |

FIG. 14

SIT

| Track | b7 ······ b2 | b1 | b0 |
|---|---|---|---|
| 1 | ············ | 1 | 0 |
| 2 | ············ | 1 | 0 |
| 3 | | 1 | 0 |
| 4 | | 0 | 1 |
| 5 | | 1 | 0 |
| 6 | | 0 | 1 |
| 7 | | 0 | 1 |
| 8 | | 0 | 1 |
| 9 | | 0 | 1 |
| ⋮ | | ⋮ | |
| 50 | ············ | 1 | 0 |

FIG. 12A PG
FIG. 12B BGP
FIG. 12C RF

TRACKING CONTROL APPARATUS

BACKGROUND OF THE INVENTION

1. Field of the Invention

This invention relates to signal recording and reproducing apparatus and, more particularly, to novel and highly-effective apparatus for recording or reproducing both digital and analog signals on or from respective substantially concentric recording tracks on a rotating disc, with only digital or analog signals being recoreded in any one of the tracks.

2. Description of the Prior Art

An electronic still camera has been developed that employs a small floppy disc on which signals representing images are recorded. The floppy disc of the prior art includes a jacket and a magnetic disc proper rotatably mounted therein. The magnetic disc is capable of having signals recorded thereon on 50 concentrics tracks. In operation, the magnetic disc is rotated and a color video signal of one field is recorded on one track of the disc to form a still picture. Digital signals may also be recorded on the magnetic disc so that the disc has tracks in which an analog video signal and digital signals, respectively, are recorded.

Closed-loop servocontrol of the magnetic head transducer is generally used for tracking the video signal, so that the RF output derived from the magnetic head is maximized and the quality of the picture is optimized. However, the digital data must be accessed at high speed, which is best accomplished by open-loop positioning of the magnetic head. These conflicting requirements have not thus far been reconciled in tracking control apparatus for recording or reproducing both digital and analog signals on or from a rotating disc having a plurality of concentric recording tracks thereon.

OBJECTS AND SUMMARY OF THE INVENTION

An object of the invention is to provide a tracking control apparatus for use with a drive system of a floppy disc that records thereon or reproduces therefrom an analog video signal and digital data in respective tracks on the disc.

Another object of the invention is to provide a tracking control apparatus that can improve the throughput of an entire floppy disc drive system.

Another object of the invention is to provide a tracking control apparatus that enables digital data to be accessed from a floppy disc at high speed and enables a video signal to be reproduced as a picture of good quality and high definition.

According to one aspect of the present invention, there is provided apparatus for recording or reproducing both digital and analog signals on or from respective substantially concentric recording tracks on a rotating disc; the apparatus comprising: transducer means mounted in substantially contacting relation to the disc for recording or reproducing the digital and analog signals on or from the respective tracks; motor means coupled to the transducer means for moving the transducer means radially with respect to the disc; track status store means for storing track identifying information for each of the recording tracks and producing a track classifying signal corresponding thereto; level detecting means for detecting levels of signals reproduced from the tracks and producing a level indicating signal corresponding thereto; and control means jointly responsive to the track classifying signal and the level indicating signal for controlling the motor means for positioning the transducer means in closed-loop servo tracking relation to a given track on the basis of the level indicating signal when the track classifying signal indicates that the given track or at least one track adjacent thereto contains an analog signal and for otherwise effecting open-loop positioning of the transducer means regardless of the level indicating signal.

BRIEF DESCRIPTION OF THE DRAWINGS

A better understanding of these and other objects, features and advantages of apparatus according to the present invention can be gained from a consideration of the following detailed description of the preferred embodiment thereof, taken in conjunction with the accompanying drawings, wherein like reference numerals designate like elements and parts, and wherein:

FIG. 9 is a diagram of a TCT (track classification table) formed on a RAM (random access memory) of a microcomputer for accessing the magnetic disc in accordance with the invention;

FIGS. 12A to 12D are respectively waveform diagrams of certain signals developed during closed-loop tracking servocontrol in accordance with the invention;

FIG. 14 is a diagram of an SIT (signal identifying table) formed on the RAM of the microcomputer in accordance with the invention.

DESCRIPTION OF THE PREFERRED EMBODIMENT

Figure 1:
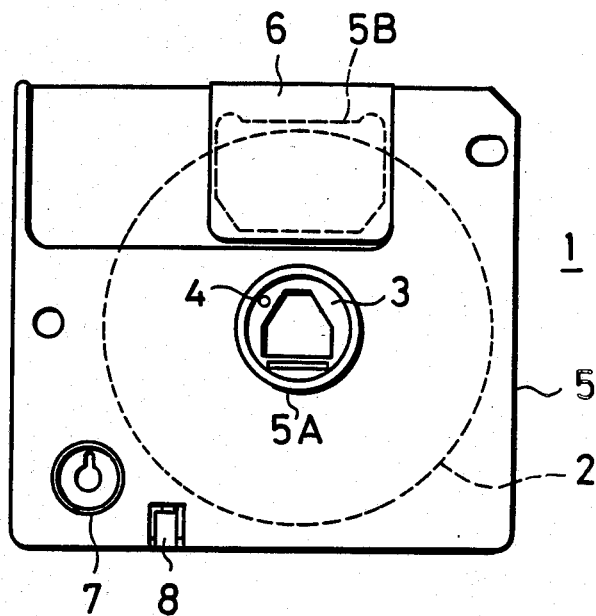
FIG. 1 is a top plan view of a floppy disc to which the present invention is applied.

FIG. 1 shows the general construction of a floppy disc 1 to which the present invention is applicable. The floppy disc 1 includes a jacket 5 and a magnetic disc 2. The magnetic disc 2 is for example 47 mm in diameter and 40 μm in thickness and is provided at its center with a center core 3 with which the spindle of a drive apparatus (not shown) is engaged. The center core 3 is provided with a magnetic member 4 that indicates the rotational position of the magnetic disc 2 when the magnetic disc 2 is rotated.

The jacket 5 of the magnetic disc 2 measures for example 60 mm×54 mm×3.6 mm, and the magnetic disc 2 is mounted rotatably therein. The jacket 5 includes a central opening 5A through which the center core 3 and the magnetic member 4 are exposed to the outside. The jacket 5 is further provided with another opening 5B through which a magnetic head (not shown) makes substantial contact with the magnetic disc 2 during recording and/or reproducing. When the floppy disc 1 is not in use, the opening 5B is closed by a slidable dust-proof shutter 6. A counter dial 7 indicates the number of pictures recorded by an electronic still camera in which the floppy disc is inserted, and a nail member 8 prevents accidental or erroneous recording. When the nail member 8 is removed recording is inhibited.

Upon recording, 50 magnetic tracks can be formed concentrically on the magnetic disc 2. The outermost track is the first track recorded, and the innermost track is the 50th track recorded. Each track width is for example 60 μm and the guard band width between the tracks is for example 40 μm.

Figure 2:
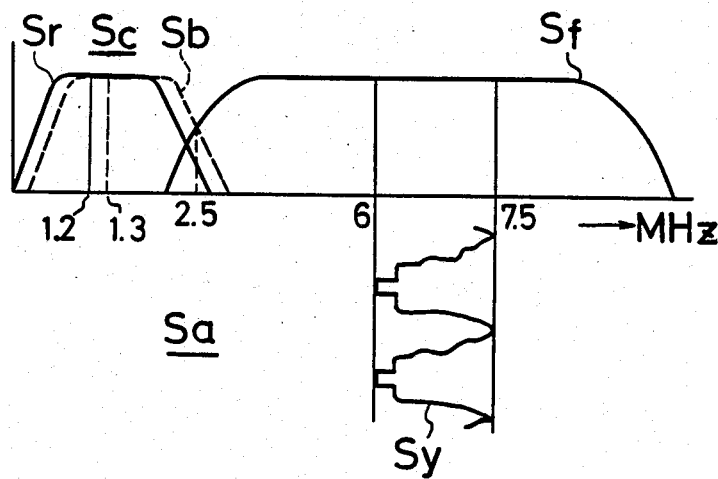
FIG. 2 is a waveform diagram showing the frequency distribution of video signals recorded on and/or reproduced from a magnetic disc proper contained within the floppy disc shown in FIG. 1.

In shooting a picture with the electronic still camera, the magnetic disc 2 is rotated at 3600 r.p.m. (field frequency), and a color video signal of one field is recorded on one track of the magnetic disc 2 in the still mode. The color video signal to be recorded has a frequency distribution shown in FIG. 2. A luminance signal Sy shown in FIG. 2 is frequency-modulated to a frequency modulated signal Sf, wherein the sync tip level is 6 MHz and the white peak level is 7.5 MHz. A line sequential color signal (chrominance signal) Sc consists of a signal Sr frequency-modulated by a red color difference signal and having a center frequency of 1.2 MHz and a signal Sb frequency-modulated by a blue color difference signal and having a center frequency of 1.3 MHz. A signal Sa obtained by adding the frequency-modulated color signal Sc and the frequency-modulated luminance signal Sy is recorded on the magnetic disc 2.

As described above, the floppy disc 1 as shown in FIG. 1 has the proper size and characteristics to serve as a recording medium for the video signal. Further, the floppy disc 1 may be used as a medium for recording digital data.

Figures 3A, 3B, 3C, 3D:
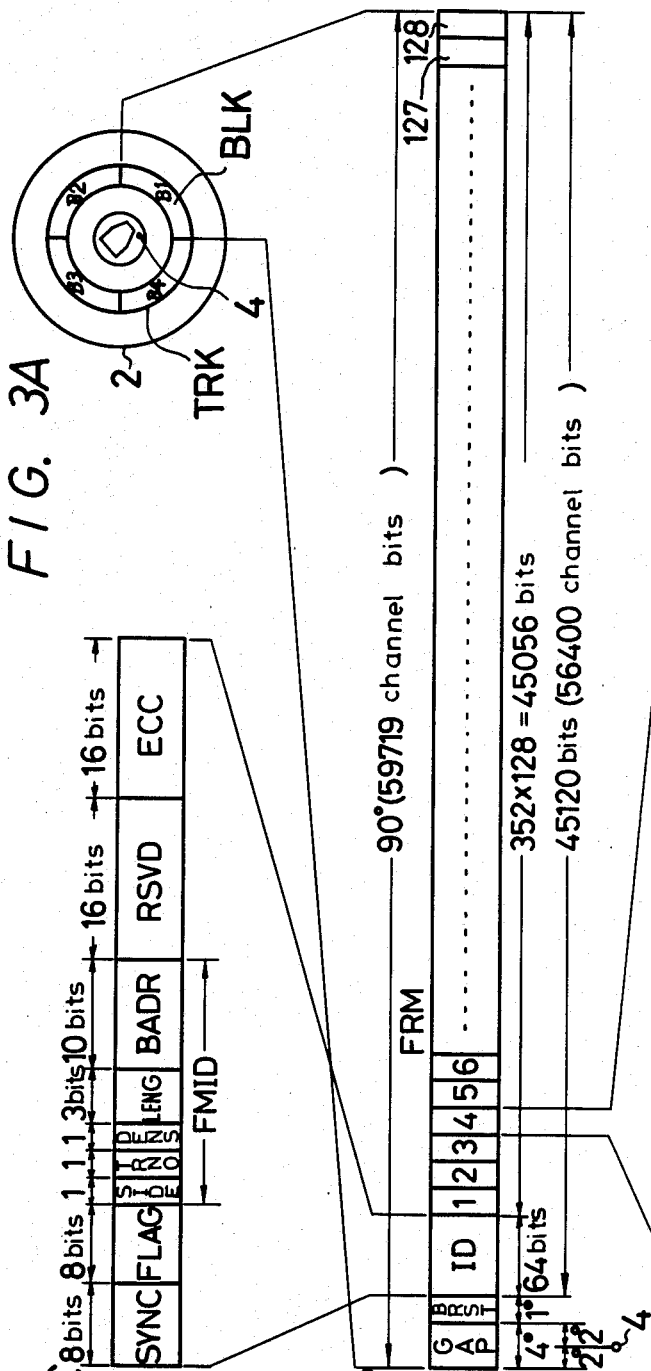
FIG. 3A is a diagram of a digital data track of the magnetic disc and showing the organization of the digital data of one track into four blocks.
FIG. 3B is a diagram showing a data format for one block of information recorded on the digital data track of FIG. 3A.
FIGS. 3C and 3D are respectively diagrams on larger scales than FIG. 3B of portions of the format of FIG. 3B.

FIGS. 3A through 3D show an arrangement of digital data when the floppy disc 1 handles digital data. In FIG. 3A, a track TRK formed on the magnetic disc 2 in the case of digital data recording is shown to be equally divided in the circumferential direction into four sections or blocks of 90° each, with the magnetic member 4 serving as a reference position. Each of the divided four sections is referred to as a block BLCK and the block BLCK of the interval commencing at the angular position corresponding to the magnetic member 4 is represented as a first block B1 and the succeeding three blocks are represented as second, third and fourth blocks B2, B3 and B4, respectively. When data is accessed from the floppy disc 1, the accessing is carried out in units of one block BLCK.

As FIG. 3B shows, in each block BLCK, an interval of 4° from its beginning constitutes a gap interval GAP which affords a margin upon reading and writing. A succeeding interval of 1° constitutes a burst interval BRST. In the first block B1, the center of the gap interval GAP corresponds to the position of the magnetic member 4. In the burst interval BRST there is recorded and/or reproduced a burst signal which contains:

i. preamble
ii. recording density
iii. flag for digital data.

The burst interval BRST is followed by an interval for an index or identifying signal ID. As FIG. 3C shows, the index signal ID consists of a synchronizing signal SYNC of 8 bits, a flag signal FLAG of 8 bits, a format identifying signal FMID of 16 bits, a reserved signal RSVD of 16 bits and an error correcting signal ECC of 16 bits. The flag signal FLAG indicates certain status information (e.g., whether or not the track TRK to which the block BLCK belongs is a bad track, whether or not it has already been erased, etc.). The format identifying signal FMID indicates the logical format of the floppy disc 1 and contains various identifying data. The signal ECC is the error correcting code for the aforementioned signals FLAG, FMID and RSVD and contains parity data.

In each block BLCK the portion immediately following the identifying signal ID is equally divided into 128 intervals, and a frame signal FRM is recorded on or reproduced from each of these 128 intervals.

As FIG. 3D shows, each frame FRM includes from its beginning sequentially a frame synchronizing signal SYNC of 8 bits, a frame address signal FADR of 16 bits, a check signal FCRC of 8 bits, a data signal DATA of 16 bytes (one byte=8 bits), a redundant or parity data signal PRTY of 4 bytes, another digital data signal DATA of 16 bytes and another redundant or parity data signal PRTY of 4 bytes. The check signal FCRC is a CRCC (cyclic redundancy check code) for the frame address signal FADR. The data signal DATA includes the essential information that needs to be accessed by a host computer and is interleaved within a period of digital data of one block BLCK. The redundant data PRTY is parity data generated by coding digital data of one block (32 bytes×128 frames) by the minimum distance 5 according to the Reed-Solomon coding method.

Accordingly, the capacities for digital data of one block BLCK, one track TRK and one floppy disc 1 are as follows:

one block: 4096 bytes (=16 bytes×2×128 frames)
one track: 16K bytes (=4096 bytes×4 blocks)
one floppy disk (recorded on one side): 800 K bytes (=16K bytes×50 tracks)

When the digital data is accessed from the floppy disc 1, the accessing is carried out one block at a time so that the digital data is accessed from the floppy disc 1 in units of 4K bytes.

The numbers of bits in one frame FRM and one block BLCK are as follows:

one frame: 352 bits (=8+16+8 bits+(16+4 bytes) ×8 bits/byte×2)

one block (only the index interval and frame intervals):
45120 bits (=352 bits×128 frames+64 bits)

In practice, when the digital signal is recorded on or reproduced from the floppy disc 1, the DSV (Digital Sum Value) is required to be small, Tmax (maximum length between transitions)/Tmin (minimum length between transitions) is required to be small, and Tw (window margin) is required to be large. Thus, all of the afore-described digital signals are subjected to 8–10 (eight-to-ten) conversion with Tmax=3.2T and Tmin=0.8T, T being one bit time before 8–10 conversion. The signals are then recorded on the floppy disc 1. Upon reproducing, they are subjected to a reverse conversion and then subjected to the succeeding inherent signal processing.

Accordingly, for the above-described data density, the practical number of the bits in the floppy disc 1 is multiplied by 10/8 and presented as:
one frame: 440 channel bits
one block (only the index signal interval and frame intervals): 56400 channel bits Thus, the number of the bits in the whole interval of one block corresponds to 59719 channel bits (≅56400 channel bits×90°/85°). Since, in practice, the length of each interval is assigned by the number of the channel bits as mentioned above, the total angle of the frame intervals is a little shorter than 85°.

Consequently, the bit rate at which the floppy disc 1 is accessed by the digital signal (signal after the 8–10 conversion) is
14.32 M bits/sec (≅59719 bits×4 blocks×field frequency) and one bit corresponds to 69.8 nano seconds (≅1/14.32 M bits).

The video signal and the digital data may be both recorded on one floppy disc 1 if they are recorded in respective tracks, i.e., each track contains only digital or only analog signals.

The format shown in FIGS. 3A through 3D enables recording and readout of 800K bytes of digital data on one side of a two-inch floppy disc. This is more than twice the capacity (320K bytes) of the prior art 5.25 inch floppy disc. Thus, the 2 inch floppy disc 1 has a large capacity in spite of its small size. Since the disc proper 2 is rotated at the same rate in recording and/or reproducing digital data as in recording and/or reproducing a video (analog) signal, the digital data and the video signal can be recorded on or reproduced from respective tracks on the same disc 2 an interspersed manner. In this case, both signals to be recorded on or reproduced from the disc 2 have a similar frequency spectrum, etc., so that they can both be recorded on or reproduced from the disc 2 under the same optimum conditions (electromagnetic conversion characteristic, contact condition with a magnetic head, etc.). Further, even when the two signals are recorded on or reproduced from respective tracks on the disc 2 since the rotational speed of the disc 2 is not changed, it is not necessary to afford extra time for changeover of the servo circuit and thus either of the two signals can selectively be used immediately. In addition, since the rotational speed of the disc 2 is constant and the need for duplicate mechanisms (electromagnetic transducer systems, etc.) is avoided, a substantial saving in the cost of manufacture results.

As described above, the floppy disc 1 is suited for recording or reproducing the video signal alone and for recording or reproducing the digital data alone. It moreover has a new utility as a medium for recording or reproducing the video signal and the digital data on respective tracks of a single disc.

In tracking the video tracks, closed-loop servocontrol is generally used for establishing the correct tracking state at the position where the RF output derived from the magnetic head is maximized and the quality of the picture is optimized.

On the other hand, in case of digital data recording, the digital data must be accessed at high speed, so that the position of the magnetic head with respect to the track is determined by an open-loop control of a step motor that drives the magnetic head. In other words, the tracking position is predetermined and does not depend on feedback. When data is written onto the disc, areas on both sides of the data track are erased, and a guard band of predetermined width is maintained between adjacent tracks.

Figure 4:
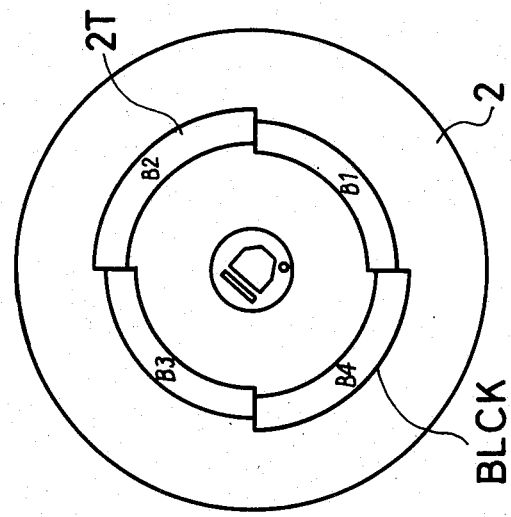
FIG. 4 is a diagram on a larger scale than FIG. 3A showing relative radial displacement of successive blocks of data on a digital data track of the magnetic disc.

In the case of the floppy disc 1 having the format described in connection with FIGS. 3A through 3D, each track is divided into four blocks and the writing and/or reading is carried out in units of one block, so that the four blocks comprising one track of digital data may be recoreded in different tracks containing digital data on the floppy disc. Therefore, all portions of a track of digital data on the floppy disc are not necessarily formed all on the very same circumference but may be radially displaced relative to each other because of head positioning play in the radial direction of the disc, the influence of temperature and humidity, etc., as shown in FIG. 4. Accordingly, in the reading mode, when the head traces the track circumferentially at the radial position predetermined by the mechanism operating in an open-loop mode, there occurs off-track positioning of the head with respect to at least some of the blocks. However, in the case of the digital data, unlike the analog video signal, it is sufficient that digital "0" and "1" be discriminated. So long as data from adjacent tracks are not mixed, the digital data can be reproduced substantially correctly. If a guard band of a width greater than a predetermined width is always formed on both sides of each track by a wide erase, data from adjacent tracks can be prevented from being mixed (i.e., crosstalk can be prevented), and thus the playback of digital data is not disturbed.

However, in the case of a floppy disc on which both a video track and a digital data track are formed, if a wide erase as described above is carried out, a serious problem arises. Specifically, when writing is performed on a track of digital data or a video track is rewritten, if a video signal is already recorded on an adjacent track, a part of the adjacent video track is erroneously erased by the wide erasure so that the track width of that part of the adjacent video track is reduced. When track width is reduced as described above, digital data is not affected so much but an analog video signal is affected considerably in that the S/N ratio thereof is substantially reduced and the quality of the reproduced picture is degraded. As a result, in the case of the floppy disc on which both a digital data track and a video signal track are formed, it is necessary that, upon recording (writing), a wide erasure not be carried out. During reproducing, on the other hand, closed-loop tracking control is necessary in order to achieve accurate tracking in respect to the video signal track or tracks.

Closed-loop tracking control for the prior art floppy disc is such that the resulting reproduced signal at a particular point of one track becomes maximum or the tracking is established on the basis of the average reproduced signal from the whole of one track. As a result, when digital data is read out from a particular track, in the worst case, the head extends to trace an adjacent track so that information from the adjacent track is mixed in as a crosstalk component, thus causing the data error rate to increase considerably.

When only digital data is recorded on a floppy disc and reproduced therefrom under the condition that one track is divided into a plurality of blocks, if the number of tracks per disc is increased so as to afford a high recording density, upon reproducing the data, servo tracking must be employed so as to prevent the head from tracing the adjacent tracks; otherwise the above-described problem of crosstalk will occur.

Further, in the case of a floppy disc on which both a video signal and digital data are recorded or reproduced on respective tracks the following problems are left unsolved.

Figure 5:
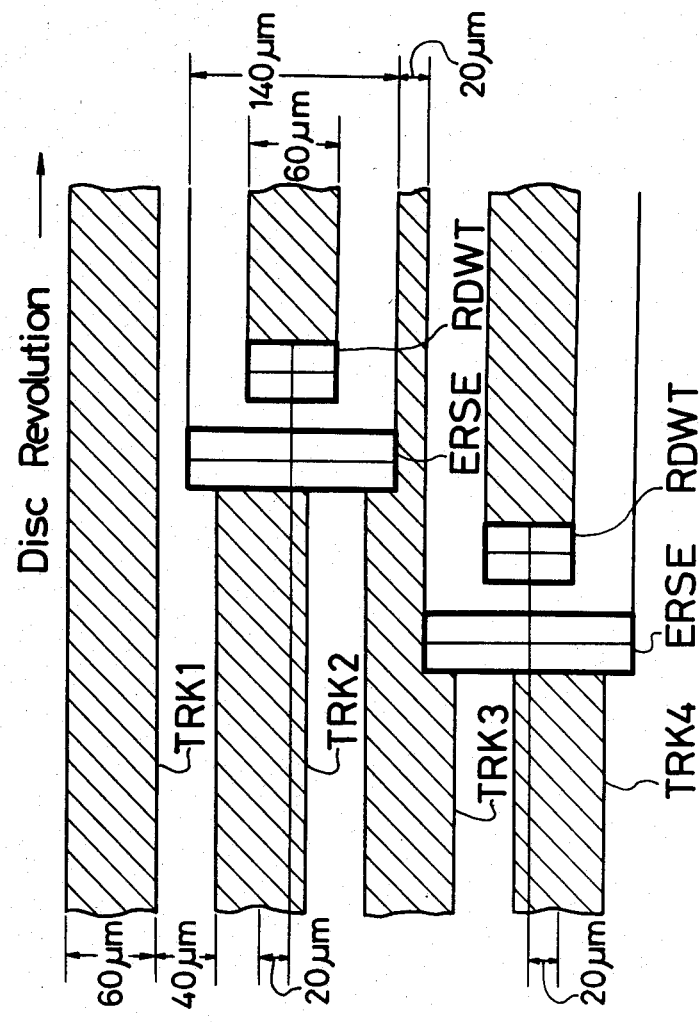
FIG. 5 is a diagram showing the operation of magnetic transducer heads on the tracks of the magnetic disc.

Let it be assumed (FIG. 5) that old tracks TRK1 to TRK4 are formed in a correct pattern and that an erase head ERSE carries out an erasure ahead of a read/write head (recording and reproducing head) RDWT and that its track width (erase width) is 140 $\mu$m.

Furthermore, let it be assumed that when a new signal is recorded over the old track TRK2, the heads ERSE and RDWT are respectively displaced by 20 $\mu$m towards the track TRK3 and that when a new signal is recorded over the old track TRK4, the heads ERSE and RDWT are respectively displaced by 20 $\mu$m towards the track TRK3. In that case, both sides of the track TRK3 are erased by the width of 20 $\mu$m each so that the remaining track width thereof is only 20 $\mu$m.

When the signal recorded on track TRK3 is digital, even if the track width is reduced to 20 $\mu$m, no serious problem occurs. However, when the signal recorded on the track TRK3 is a video signal (i.e., an analog signal), the reduction in track width seriously degrades the quality of the reproduced picture.

Therefore, provision of a closed-loop tracking servo circuit in the drive mechanism of the heads ERSE and RDWT as employed in a VTR (video tape recorder) may be thought to provide a solution. That is, when a new signal is recorded on the track TRK2 (and the track TRK4), the tracking servo is applied to the heads for the old track TRK2 (and TRK4) thereby to determine the tracking positions of the heads ERSE and RDWT, and then the new signal is recorded on a new track TRK2 (and TRK4) in a position the same as that of the old track TRK2 (and TRK4).

Accordingly, it might be thought that since the track width of the track TRK3 can be safeguarded against partial erasure, even if a video signal is recorded on the track TRK3 the quality of the reproduced picture can be preserved.

However, if the positions of the heads ERSE and RDWT are determined by a closed loop tracking servo control, the response time for the heads ERSE and RDWT to stabilize their positions on the track is so long that the digital data can not be recorded on the disc at sufficiently high speed.

Figure 6:
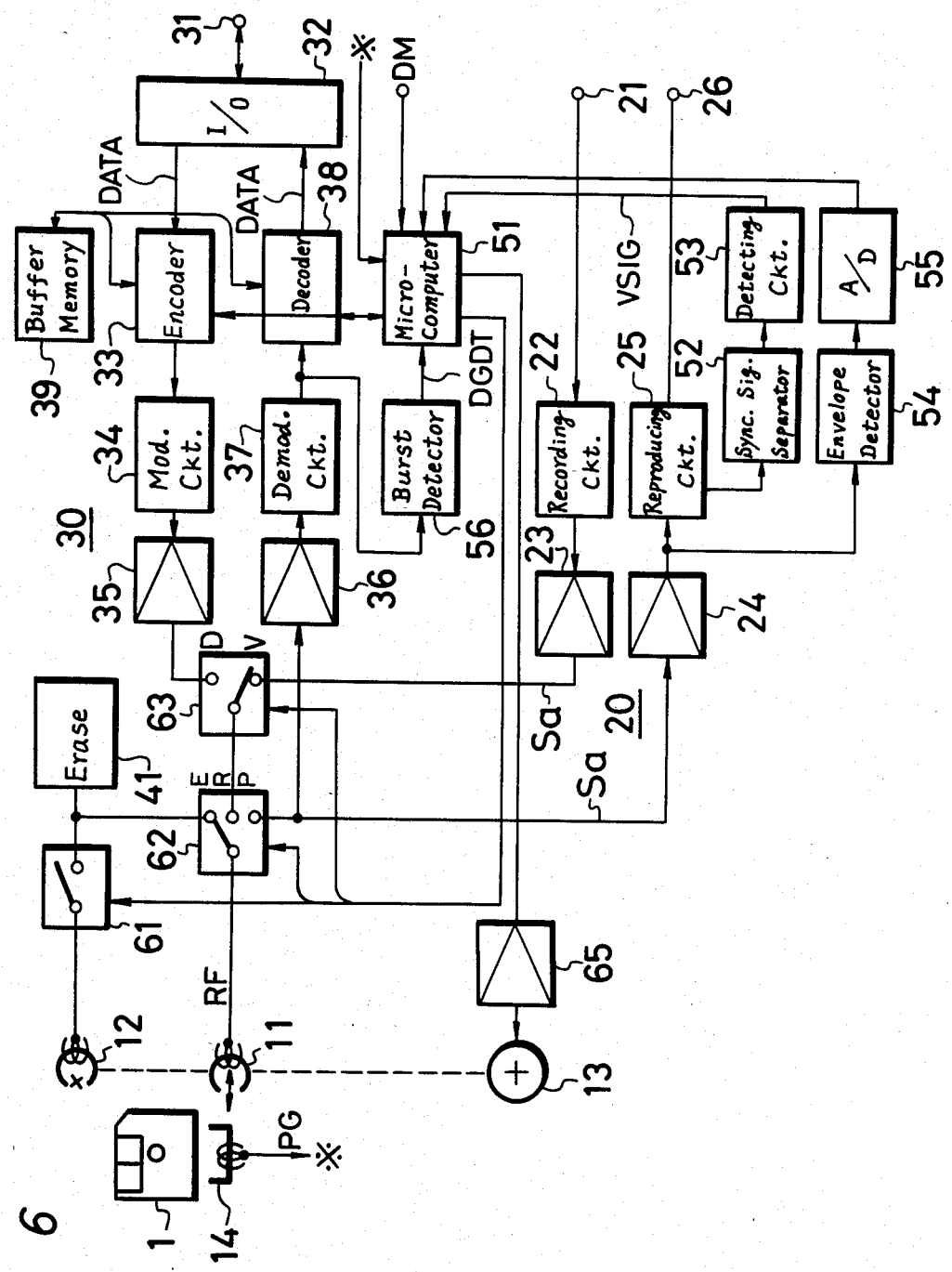
FIG. 6 is a schematic block diagram showing a preferred embodiment of the floppy disc drive system according to the invention.

FIG. 6 is a schematic block diagram showing an example of the floppy disc drive system to which the present invention is applied.

In FIG. 6, a read head 11 and an erase head 12 are formed integrally so that the head 12 is ahead of the head 11 and the centers of their tracks coincide with each other. The track position of each head can be changed in steps of, for example, 5 $\mu$m by a step motor 13. The track width of the read head 11 is 60 $\mu$m, while the track width of the erase head 12 is 140 $\mu$m (see also FIGS. 5, 8A and 8B).

Figure 12D:
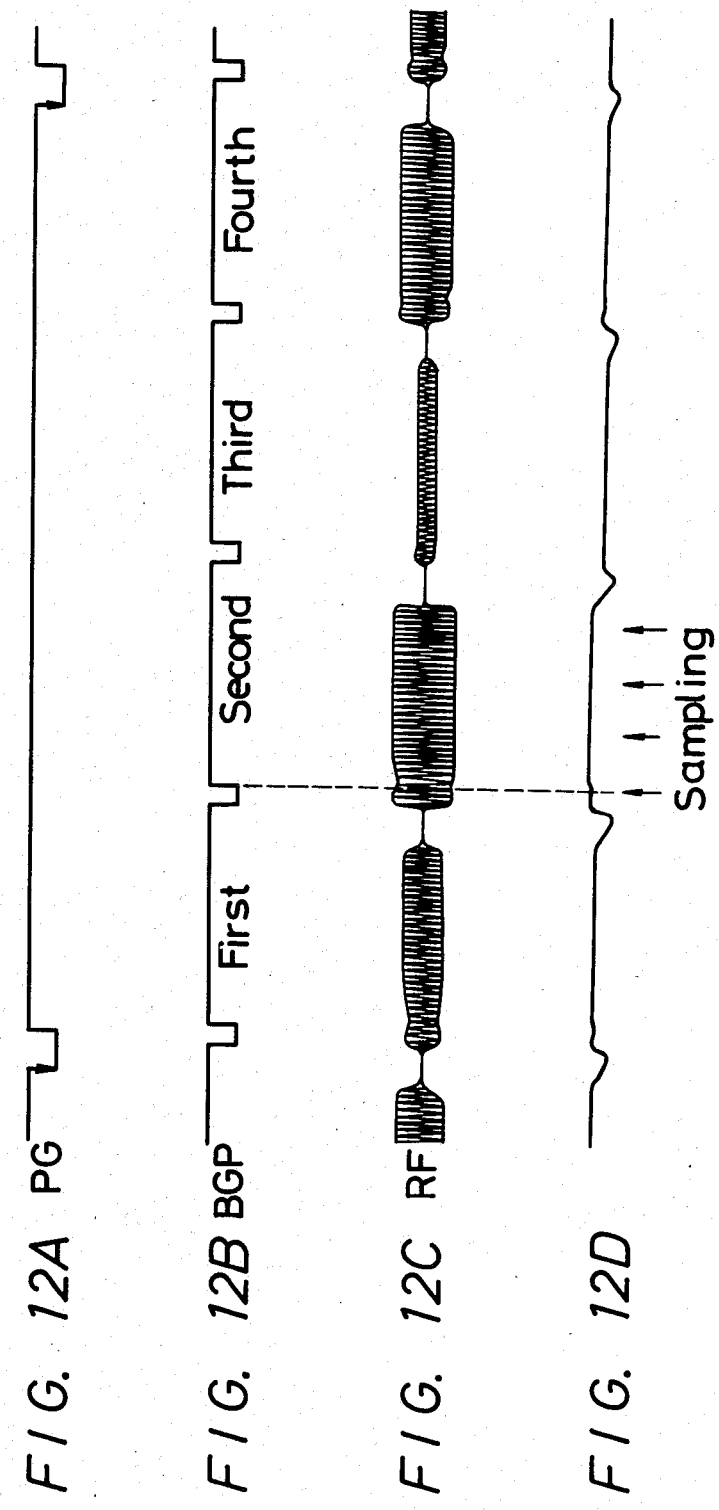

The heads 11 and 12 are positioned in transducing relation with a magnetic disc 2 (FIG. 1) of a floppy disc 1 and the disc 2 is rotated at 60 revolutions per second by a spindle motor (not shown). Pulse generating means 14 is provided in association with the magnetic member 4 (FIGS. 3A and 4) of the floppy disc 1. The pulse generating means 14 produces a pulse PG (FIGS. 6 and 12A) which indicates each rotation of the disc 2.

A recording and/or reproducing section 20 (FIG. 6) processes the video (analog) signal and a recording and/or reproducing section 30 processes the digital data. A source 41 produces an erase current. A microcomputer 51 controls the operation of the entire system.

The microcomputer 51 is supplied with the output pulse PG from the pulse generating means 14 and is connected to a host computer (not shown) from which control signals (commands and parameters) for accessing the floppy disc 1 are supplied. The host computer may be a desk-top business or personal computer or a built-in type.

Figure 7:
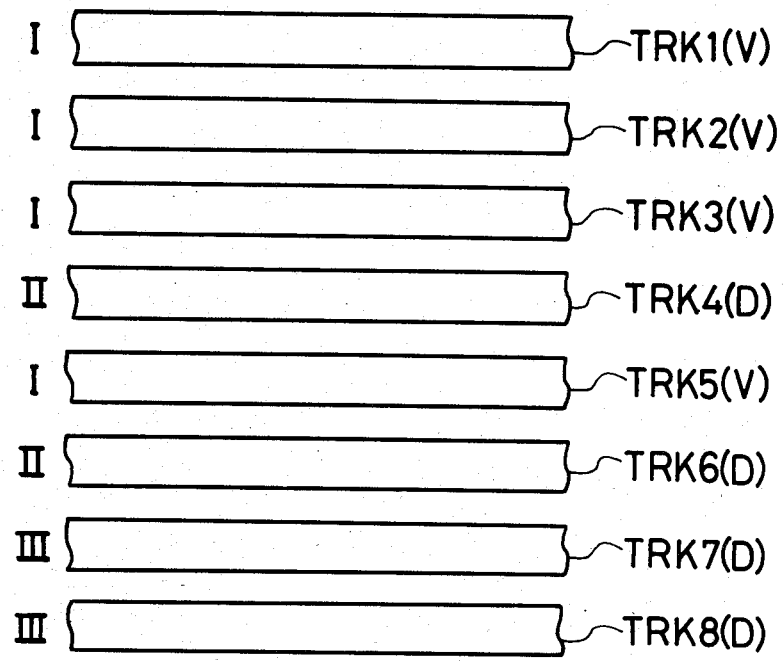
FIG. 7 is a diagram of a plurality of tracks illustrating the classification thereof.

Let it be assumed that the video signal and the digital data are recorded on respective tracks, as shown in FIG. 7, that is, the video signal is recorded on tracks TRK1, TRK2, TRK3 and TRK5; and digital data are recorded on tracks TRK4, TRK6, TRK7 and TRK8. Of course, all other possible combinations of the video signal tracks and the digital data tracks may be employed.

These possible combinations of tracks are classified into the following three cases I to III.

case I: Tracks on which the video signal is recorded. Tracks TRK1, TRK2, TRK3 and TRK5 exemplify this case. The content of adjacent tracks in immaterial.

case II: Tracks on which digital data is recorded, provided that at least one of the adjacent tracks contains a video signal. Tracks TRK4 and TRK6 exemplify this case.

case III: Tracks on which digital data is recorded, provided that adjacent tracks contain digital data. Tracks TRK7 and TRK8 exemplify this case.

When the track is erased and the the signal is re-recorded thereover and then when the re-recorded is reproduced, in accordance with cases I to III, the control operations described in the following tables 1 to 5 are required in accordance with the present invention.

TABLE 1

| Case No. | Head used in erase operation |
| --- | --- |
| I | read/write head |
| II | read/write head |
| III | wide erase head positioned ahead of read/write head |

TABLE 2

| Case No. | Erase Method |
| --- | --- |
| I | Head position is determined by a closed loop. (See FIG. 8A) |
| II | Similar to case I, where only a specified block BLCK is erased. |
| III | Head position is determined by an open loop. A specified block BLCK is erased simultaneously (see FIG. 8B). |

TABLE 3

| Case No. | Erase Time |
| --- | --- |
| I | ≃100 milliseconds |
| II | ≃100 milliseconds |
| III | one field period (simultaneous with the recording) |

TABLE 4

| Case No. | The positioning of head upon re-recording |
| --- | --- |
| I | Head position is determined by a closed loop. Signal is recorded at the position determined by the positions of old track and adjacent track. |
| II | Similar to case I, where the position is carried out on only a specified block BLCK. |
| III | Open loop. The position is predetermined by the mechanism. |

TABLE 5

| Case No. | The positioning of head upon reproducing |
| --- | --- |
| I | Closed loop servo tracking is employed to maximize the output from the head. |
| II | Similar to case I, where the positioning is carried out on only a specified block BLCK. |
| III | Open loop. The position is determined mainly by the mechanism. |

When the floppy disc 1 is set in a recordable state or booted, a track classification table TCT indicating that the track TRK belongs to one of the cases I to III is formed in a memory as shown in FIG. 9, and the above-described processing is carried out with reference to the table TCT. It is needless to say that when the kind of the signal recorded on the track TRK is changed, the table TCT is also updated. Furthermore, the signal recorded on each track is accessed with reference to the table TCT and the accessing operation is carried out on the basis of the reference results as follows.

A. Playback in case I

In case I, when the control signal DM (FIG. 6) is supplied to the microcomputer 51 from the host computer (not shown), a switching circuit 61 is turned off by an output from the microcomputer 51 and a switching circuit 62 is changed in position to a playback contact P.

Figure 10:
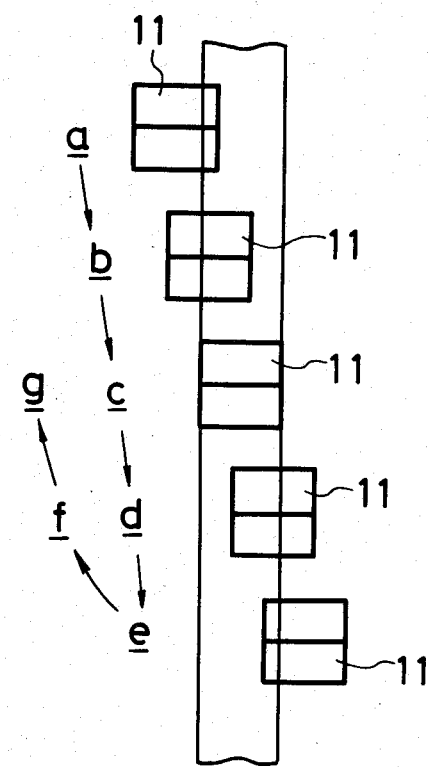
FIG. 10 is a diagram illustrating closed-loop servocontrol of the position of the transducer of FIG. 6 with respect to a given track.

From the microcomputer 51, a drive signal (drive pulse and direction signal) is supplied to the step motor 13 whereby the heads 11 and 12 are moved toward the specified track TRK. When the head 11 nears the specified track TRK, the track position thereof is determined by closed-loop servocontrol. In other words, when the head 11 approaches the desired or specified track TRK, the position of the head 11 is sequentially controlled as shown by characters a to g in FIG. 10.

Figure 11:
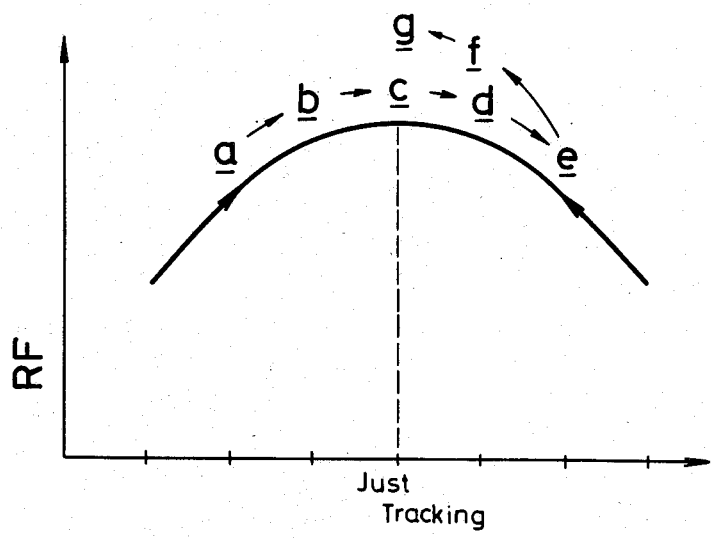
FIG. 11 is a diagram showing the relation between the RF output of the transducer of FIG. 6 and the adjustment of the tracking condition as illustrated in FIG. 10.

When the head 11 is moved as shown by the characters a to e, the reproducing level of the output therefrom is changed as shown by characters a to e in FIG. 11 and becomes a maximum at the position c.

During this operation, the reproduced signal (video signal Sa in FIG. 2) from the head 11 is supplied through the playback contact P of the switching circuit 62 and a playback amplifier 24 to an envelope detecting circuit 54 which produces a signal indicative of the reproducing level of the output from head 11. This signal is converted to a digital signal by an A/D (analog-to-digital) converter 55 and then supplied to the microcomputer 51. In the microcomputer 51, the change of the reproducing level relative to the head positions a to e is checked on the basis of the signal from the A/D converter 55. Since the reproducing level becomes maximum when the head position is at c (FIGS. 10 and 11), the head position is changed as e→f→g in FIG. 10 and the head 11 is fixed at the position shown by g, namely the optimum tracking position.

Thus the head 11 is fixed at the position of the specified track TRK by the closed loop servocontrol.

The signal reproduced by the head 11 and amplified by the playback amplifier 24 is supplied to a reproducing circuit 25, in which it is converted to the original video signal of, for example, the NTSC system, and this video signal is delivered at a terminal 26.

B. Playback in case II

In case II, the position of the head 11 during playback is determined in a manner similar to that described above. In case II, however, since the digital data is recorded in units of one block BLCK, a given track is frequently not formed entirely along the very same circumference (see FIG. 4).

Accordingly, when the position of the head 11 is determined by closed-loop servocontrol, the reproducing level of only a specified block BLCK is detected, thereby to determine the position of the head 11.

The tracking operation for the digital data track is carried out as follows:

When the microcomputer 51 is supplied with a command DM which commands the reading of the data of, say, the second block of a given digital data track, a servo tracking mode is established by which the second block is optimally read.

The pulse generator 14 in FIG. 6 produces one pulse PG (FIGS. 6 and 12A) per revolution of the disc 2. Since the digital data track is formed so that the position of the magnetic member 4 coincides with the gap portion GAP of the first block of each track, the position of the beginning of the first block of each track can be determined from the pulse PG. This pulse PG is supplied to the microcomputer 51. The microcomputer 51 can then detect one of the blocks traced by the head 11.

In the playback mode, the RF output from the amplifier 24 is supplied to and detected by the envelope detecting circuit 54 and the envelope-detected output from the envelope detecting circuit 54 is converted to a digital signal by the A/D converter 55 and then supplied to the microcomputer 51. In the microcomputer 51, only the desired envelope-detected output of the RF output from the second block is sampled and hence servo tracking is effected so that the envelope-detected output of the RF output of the second block becomes maximum.

The motor drive pulse from the microcomputer 51 is supplied through a motor drive circuit 65 to the step motor 13 which drives the head 11 to move in the radial direction of the disc 2. In this case, the head 11 is moved a radial distance equal to one track pitch by n pulses supplied to the step motor 13, where n is a positive integer. Accordingly, one pulse allows the head 11 to move by a very small distance such as 5 μm in the radial direction. Of course, the moving direction of the head 11 is determined by the polarity of the drive signal from the microcomputer 51. Thus, the head 11 is moved by a 5 μm step in the radially outward or radially inward direction of the disc by supplying an appropriate pulse or series of pulses to the motor 13.

Under the control of the microcomputer 51, the position of the head in the radial direction of the disc (i.e., the tracking position) is changed gradually, and the tracking position at which the envelope-detected output of the RF output of the second block becomes maximum is detected, so that servocontrol is effected and an optimum tracking state is maintained at all times.

The tracking servo in this case is the same as the tracking servo used in the case of reproducing the video signal.

Figure 13:
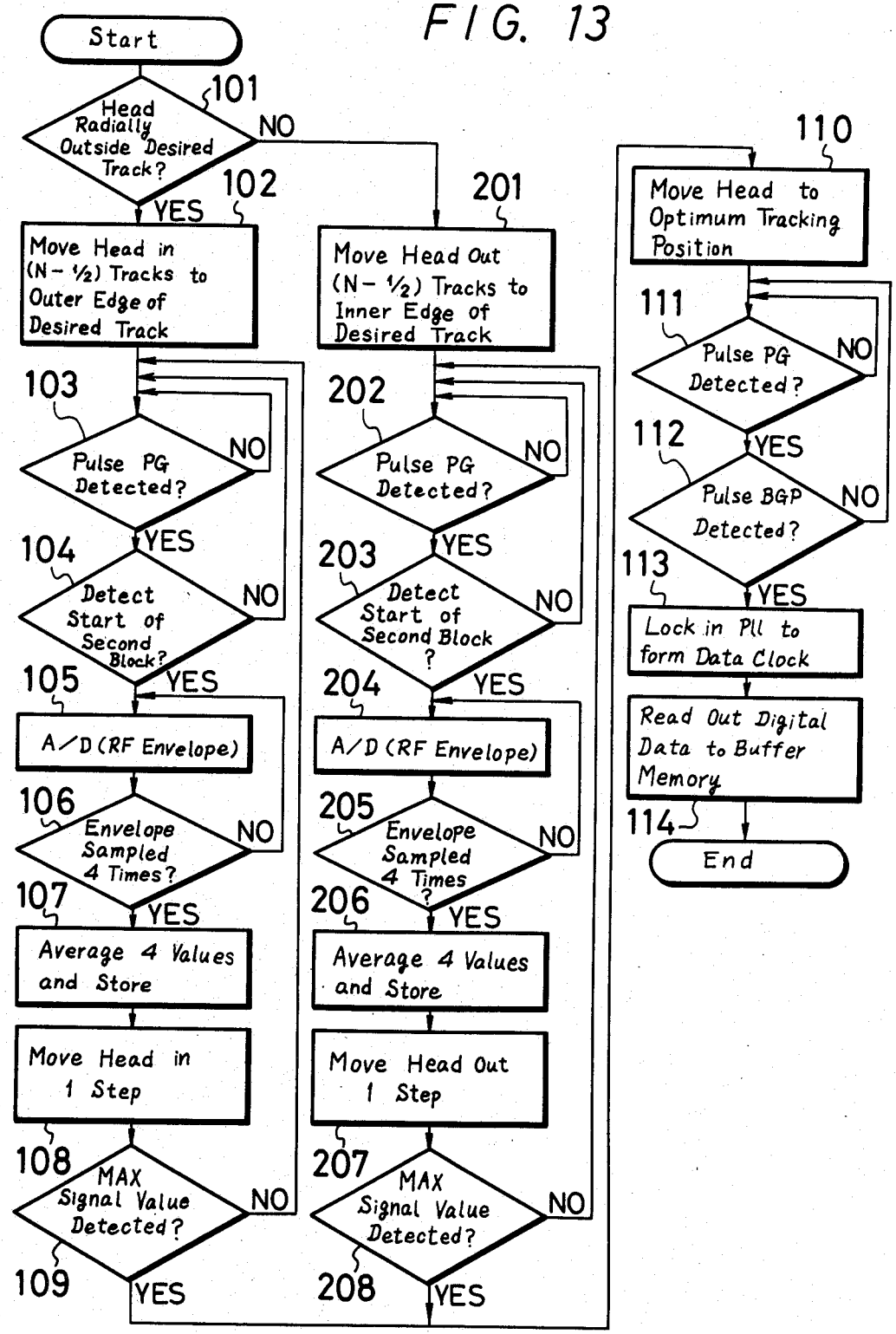
FIG. 13 is a flow chart showing an example of tracking servocontrol in accordance with the invention.

FIG. 13 is a flow chart showing this tracking control.

As shown in FIG. 13, at step 101, it is determined whether or not the present head position is radially outside the desired read track. If it is outside the desired read track and displaced by N tracks, the head 11 is driven a distance corresponding to $(N-\frac{1}{2})$ tracks by the step motor 13 and brought to the radially outer edge of the desired track (at step 102). If on the other hand the present head position is inside the desired read track, the head 11 is driven a distance corresponding to $(N-\frac{1}{2})$ tracks by the step motor 13 and brought to the radially inner edge of the desired track (at step 201).

The reason for this is that, if the head 11 is driven by N tracks a distance corresponding to the step motor 13, then, because of displacement due to mechanical play, it becomes unclear in which direction the head 11 is displaced from the optimum tracking position of the desired track. Therefore, the head 11 must be intentionally displaced in a particular and known direction from the optimum tracking position; also, it is desirable that the movement of the head 11 be reduced as much as possible.

After step 102 or 201, the program advances to steps 103 to 109 or steps 202 to 208 in which it determines the tracking position at which a maximum value of the envelope of the RF output of the second block of the given track is detected by the detector 54.

More specifically, whether or not the pulse PG (FIGS. 6 and 12A) is detected at the tracking position is determined (step 103 or 202). If the pulse PG is detected, it is determined whether or not the beginning of the second block has been detected by counting a burst gate pulse BGP (FIG. 12B) from the position of the pulse PG (step 104 or 203). If the beginning of the second block is detected, the RF envelope-detected output (FIG. 12C) of the second block is converted from analog to digital form (step 105 or 204). Then, it is determined whether or not the resultant digital envelope-detected signal has been sampled four times (FIG. 12D) (step 106 or 205). If so, the average value of the four sampled values is calculated and then stored (step 107 or 206).

The reason the digital signal is sampled four times and the average value thereof is calculated from the four sampled values is related to the eccentricity of the center spindle aperture of the disc 2. The eccentricity causes the envelope of the RF output from the head 11 to undulate. This undulation appears normally one cycle, and at the most two cycles per rotation of the disc 2. Accordingly, one block, which is $\frac{1}{4}$ of one track, is included in a semi-cycle of the undulation occuring at the maximum rate. In consequence, if the data is sampled four times and the average value is calculated from the four sampled values, it becomes possible to obtain a reliable tracking value.

After the average value is stored, the head 11 is moved one step to a tracking position which is removed from the preceding position by a distance corresponding to one pulse (step 108 or 207). In this case, at step 108, the head 11 is moved in the central direction of the disc 2 (i.e., radially inward), while at step 207, the head 11 is moved towards the outer periphery of the disc 2 (i.e., radially outward).

Subsequently, it is determined whether or not the maximum signal value is detected from the stored average value (step 109 or 208). If not, steps 103 to 109 or steps 202 to 208 are repeated until the maximum value is detected.

When the maximum value is calculated from the average value of the sampled values of the RF envelope-detected output at each tracking position by moving the head 11 a plurality of times, it is detected that the head 11 is moved to the optimum tracking position (step 110). When the beginning of the second block is detected from the pulse PG (FIG. 12A) and the pulse BGP (FIG. 12B) at steps 111 and 112 (FIG. 13), a PLL (phase locked loop) for forming a data extracting clock is locked in by the burst signal BRST (step 113) and the digital data is read out and then stored in a buffer memory (step 114).

In the example described above, the distance moved by the head 11 from an initial position to a specific or desired track position is reduced as much as possible. For this reason, the directions in which the head is moved by the servocontrol are opposite to each other at steps 108 and 207. However, when the initial head position is radially inside the desired track, if the head 11 is driven to move by $(N+\frac{1}{2})$ track pitches instead of $(N-\frac{1}{2})$ track pitches at step 201, the head 11 is brought to the distal edge (in this case the radially outer edge) instead of the proximal edge of the desired track so that, at step 207, servocontrol can be carried out by driving the head 11 to move one step at a time in the radially inward direction, just as in step 108. Similarly, if the head 11 is driven to move by $(N+\frac{1}{2})$ track pitches in the radially inward direction at step 102, the head is brought to the distal edge (in this case the radially inner edge) instead of the proximal edge of the desired track, and servocontrol can be carried out by driving the head 11 to move one step at a time in the radially outward direction at step 108, just as in step 207. In that case, the direction of fine stepwise adjustment of the head 11 becomes reverse to that described above and illustrated in FIG. 13.

When tracking is effected with the maximum envelope-detected output of the RF output from the second block, the RF output of the head 11 becomes as shown in FIG. 12C.

As described above, when the position of the head 11 is determined by closed-loop servocontrol, the reproducing level of only the desired block BLCK is detected, thereby to determine the head position.

When the position of the head 11 (FIG. 6) is determined, the reproduced signal (digital data) from the head 11 is supplied through the contact P of the switching circuit 62 and a playback amplifier 36 to a demodulating circuit 37 in which it is converted from 10-to-8 bit digital data. The converted 8 bit digital data is supplied to a decoder 38 and the signal of the desired block BLCK is written in a buffer memory 39 with a capacity of one block. The signal from the memory 39 is de-interleaved by the decoder 38 and corrected therein for error by the use of the redundant code PRTY so as to become a correct digital data signal DATA. This correct digital data signal DATA is developed at a terminal 31 through an input/output interface 32 and then supplied to the host computer (not shown).

C. Playback in case III

From the microcomputer 51, the drive signal is supplied to the step motor 13 so that the head 11 is moved to the specified track TRK by open-loop control and the head position is fixed at that point.

Thereafter, the specified data DATA is played back in a manner similar to that described above under heading B for playback in case II.

D. Erasing and recording in case I

The position of the head 11 during erasing and recording in case I is determined in a manner similar to that described above under heading A for playback in case I. In this case, however, the old track TRK being erased is the homing position for the servo.

Figure 8A:
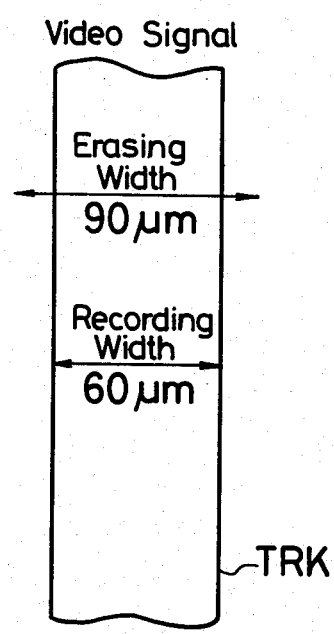
FIGS. 8A and 8B are diagrams respectively showing the recording of a video signal and a digital data signal in accordance with the invention.
Figure 8B:
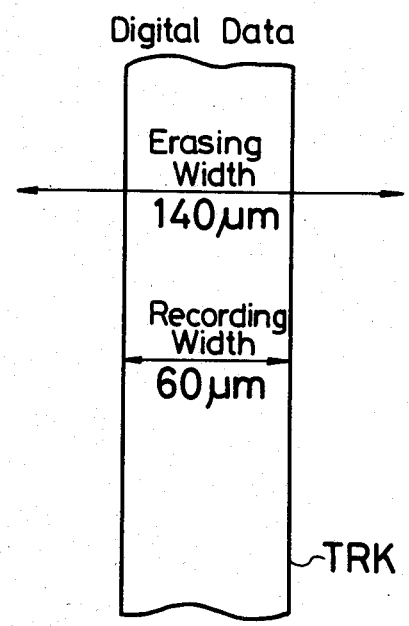

By the output from the microcomputer 51, the switching circuit 62 is moved to the erase contact E so that erase current from the current source 41 is supplied to the head 11. The drive signal is supplied from the microcomputer 51 to the step motor 13, whereby the position of the head 11 is changed stepwise at, for example, every rotation of the disc 2. Thus as FIG. 8A shows, the track, including the right and left edge portions, is fully erased because of the overlapping relationship of the erase head.

When the erasure is ended, the head 11 is returned to the position which is determined initially. Then the switching circuit 62 is moved to the recording contact R by an output form the microcomputer 51 and the switching circuit 63 is moved to the video signal contact V. A color video signal from an outside source (not shown) is supplied through a terminal 21 to a recording circuit 22 in which it is converted to the video signal Sa. One field of the signal Sa is supplied through a recording amplifier 23 and the switching circuits 63 and 62 to the head 11, which records it as a track TRK on the disc 2.

E. Erasing and recording in case II

The position of the head 11 during erasing and recording in case II is determined in a manner similar to that described above under heading D for erasing and recording in case I. In this case, however, only the head 11 is servo-controlled, and only for the specified block BLCK, as described under heading B above relating to playback in case II.

When the position of the head 11 is determined, the specified block BLCK is erased by the head 11 in a manner similar to that described above under heading D for erasing and recording in case I.

When the erasure is ended, the head 11 is returned to the position which is determined initially. Then the switching circuit 62 is moved to the contact R by the output from the microcomputer 51 and the switching circuit 63 is moved to the digital data contact D.

The digital data from the host computer (not shown) is supplied through the terminal 31 and the interface 32 to an encoder 33 for writing in the memory 39. Also, this digital data is added with the redundant data PRTY and interleaved by the encoder 33. The data from the memory 39 is sequentially supplied via the encoder 33 to a modulating circuit 34 in which it is converted from 8-to-10 bit digital data. The converted data is supplied through a recording amplifier 35 and the switching circuits 63 and 62 to the head 11 and thereby recorded on the corresponding block BLCK.

F. Erasing and recording in case III

The position of the head 11 during erasing and recording in case III is determined in a manner similar to that described above under heading C for playback in case III.

When the position of the head 11 is determined, the switching circuit 61 is switched on by an output from the microcomputer 51 and the switching circuits 62 and 63 are moved to the contacts R and D, respectively. In this way, the erase current from the current source 41 is supplied to the head 12 whereby the desired block BLCK is erased first with a substantial erase margin on either side and the digital data is recorded on the same block BLCK.

The operations described above under headings A through F are carried out with reference to the TCT table (track classification table) and on the basis of the reference results. The TCT table (FIG. 9) is formed as follows.

When the floppy disc 1 is booted or re-booted, the switching circuit 62 (FIG. 6) is moved to the contact P by the output from the microcomputer 51 and the drive signal is supplied to the step motor 13 from the microcomputer 51 so that all of the tracks from first to 50th are sequentially searched by the head 11. Accordingly, the head 11 reproduces the signals recorded on the tracks TRK and the reproduced signals are supplied through the switching circuit 62 to the amplifiers 24 and 36.

When the reproduced signal from the head 11 is the video signal Sa (FIG. 2), the reproducing circuit 25 produces the luminance signal Sy. The luminance signal Sy is supplied to a synchronizing signal separating circuit 52 from which the horizontal synchronizing pulse $P_H$ is derived. The presence or absence of the horizontal synchronizing pulse is detected by a detecting circuit 53 and the detected output VSIG is supplied to the microcomputer 51.

When the reproduced signal from the head 11 is the digital data signal, the demodulating circuit 37 produces a digital signal which is converted from 10-to-8 bit digital data. This data signal is supplied to a burst detecting circuit 56 which then detects the presence or absence of the burst signal BRST; and the resulting detected output DGDT is supplied to the microcomputer 51.

The microcomputer 51 forms a signal identifying table SIT as shown, for example, in FIG. 14 in accordance with the detected outputs VSIG and DGDT (FIG. 6). That is, the table SIT is recorded in the RAM (random access memory) of the microcomputer 51, and the addresses 1 to 50 of the RAM correspond to the first to 50th tracks of the floppy disc 1. The address in this case is a relative address and is formed with reference to a certain predetermined absolute address SADR. Thus, the first address, corresponding, for example, to the first track, is (SADR+1).

In each address, the bit $b_0$ and the bit $b_1$ of the data indicate the kinds of the reproduced signals and are changed in accordance with the detected outputs VSIG and DGDT as follows:

TABLE 6

| detected outputs | bit | | (reproduced signal) |
|---|---|---|---|
| | $b_1$ | $b_0$ | |
| VSIG exists | 1 | 0 | in the case of video signal |
| DGDT exists | 0 | 1 | in the case of digital signal |
| neither VSIG nor DGDT exists | 0 | 0 | no signal exists |

The remaining bits $b_2$ to $b_7$ are all predetermined, for example "0".

The track classification table TCT is recorded in the RAM of the microcomputer 51 on the basis of the signal identifying table SIT.

In table TCT, the relative addresses 1 to 50 of the RAM correspond to the 1st to 50th tracks, respectively. In each address, the seventh bit $b_7$ and the sixth bit $b_6$ of the data indicate the cases I to III of the corresponding tracks TRK, in accordance with the following table:

TABLE 7

| kinds of track TRK | bits | |
|---|---|---|
| | $b_7$ | $b_6$ |
| case I | 0 | 0 |
| case II | 0 | 1 |
| case III | 1 | 0 |
| no signal exists | 1 | 1 |

The remaining fifth bit $b_5$ to zero-th bit $b_0$ are available to indicate status information regarding each track, etc.

When the signal of the floppy disc 1 is accessed, the table TCT is referred to. On the basis of reference results, the signal on the floppy disc 1 is accessed by one of the methods A to F described above.

When the signal is recorded on the floppy disc 1 with the result that the signal recorded on the track TRK is changed from a video signal to a digital data signal or vice versa, the corresponding data on the tables SIT and TCT are updated.

As set forth above, according to this invention, the methods of controlling the head position and accessing the signal on the floppy disc are optimized as shown in tables 1 to 5 in accordance with the kinds of signals on a given track TRK and the tracks adjacent thereto. It is thus possible to improve the throughput of the whole system. In particular, the digital data can be accessed at high speed and a picture of good quality and high definition can be reproduced from the video signal.

In the embodiment described above, the tables TCT and SIT can be modified into other formats. For instance, the tables TCT and SIT can be intergrated with each other.

Further, the table SIT can be formed as a part of a directory on the floppy disc 1, and upon booting the floppy disc 1, the table TCT can be formed by reading the directory. Also, the table TCT can itself be formed as part of the directory.

Thus there is provided in accordance with the invention novel and highly-effective apparatus for recording or reproducing both digital and analog signals on or from respective substantially concentric recording tracks on a rotating disc. Many modifications of the preferred embodiment of the invention disclosed herein will readily occur to those skilled in the art upon consideration of this disclosure. For example, while the tracks TRK are described above as concentric and discrete, they may from a spiral, as those skilled in the art will readily understand. Accordingly, the invention is limited only by the appended claims.

I claim as my invention:

1. Apparatus for recording or reproducing both digital and analog signals on or from respective substantially concentric recording tracks on a rotating disc, with only digital or analog signals being recorded in any one of said tracks; said apparatus comprising:
   transducer means mounted in substantially contacting relation to said disc for recording or reproducing said digital and analog signals on or from said respective tracks;
   motor means coupled to said transducer means for moving said transducer means radially with respect to said disc;
   track status store means for storing track identifying information for each of said recording tracks and producing a track classifying signal corresponding thereto;
   level detecting means for detecting levels of signals reproduced from said tracks and producing a level indicating signal corresponding thereto; and
   control means jointly responsive to said track classifying signal and said level indicating signal for controlling said motor means for positioning said transducer means in closed-loop servo tracking relation to a given track on the basis of said level indicating signal when said track classifying signal indicates that said given track or at least one track adjacent thereto contains an analog signal and for otherwise effecting open-loop positioning of said transducer means regardless of said level indicating signal.

2. Apparatus as in claim 1; wherein said given track contains digital signals, each of said tracks containing digital signals is divided into a plurality of sections, and, when said track classifying signal indicates that at least one track adjacent to said given track contains an analog signal, said control means is responsive to said level indicating signal for controlling said motor means for positioning said transducer means in closed-loop servo tracking relation to each of said sections.

3. Apparatus as in claim 2; wherein said transducer means comprises an erase head and a recording and reproducing head, said erase head is mounted ahead of said recording and reproducing head, and, when said track classifying signal indicates that the tracks adjacent to said given track contain digital data, said erase head is actuated during recording of digital data on said given track.

4. Apparatus as in claim 3; wherein said erase head has a width greater than that of said recording and reproducing head.

5. Apparatus as in claim 1; wherein, in said closed-loop servo tracking of said given track, said motor means positions said transducer means in an initial position radially displaced with respect to said given track, then moves said transducer means radially to one edge of said given track, and thereafter moves said transducer means radially in small steps in response to said level detecting means, thereby establishing an optimum tracking position.

6. Apparatus as in claim 5; wherein said one edge is proximal with respect to said initial position.

7. Apparatus as in claim 5; wherein said edge is distal with respect to said initial position.

* * * * *